United States Patent
Ryon et al.

(10) Patent No.: US 10,523,688 B1
(45) Date of Patent: Dec. 31, 2019

(54) COMPUTING SYSTEM ATTESTATION

(71) Applicant: Rockwell Collins, Inc., Cedar Rapids, IA (US)

(72) Inventors: Luke E. Ryon, Cedar Rapids, IA (US); Gregory W. Rice, Cedar Rapids, IA (US); James N. Potts, Cedar Rapids, IA (US); Mark A. Bortz, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 199 days.

(21) Appl. No.: 15/485,964

(22) Filed: Apr. 12, 2017

(51) Int. Cl.
| | |
|---|---|
| *G06F 21/00* | (2013.01) |
| *H04L 29/06* | (2006.01) |
| *H04L 9/32* | (2006.01) |
| *G06F 21/57* | (2013.01) |
| *H04L 29/08* | (2006.01) |

(52) U.S. Cl.
CPC .......... *H04L 63/123* (2013.01); *G06F 21/57* (2013.01); *H04L 9/3236* (2013.01); *H04L 63/0428* (2013.01); *H04L 67/12* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 2009/0177882 A1* | 7/2009 | Saran | H04L 63/0853 713/159 |
| 2015/0215762 A1* | 7/2015 | Edge | H04W 8/005 370/338 |
| 2016/0092700 A1* | 3/2016 | Smith | G06F 21/566 726/1 |
| 2018/0212966 A1* | 7/2018 | Costa | H04L 63/10 |

\* cited by examiner

*Primary Examiner* — Alexander Lagor
(74) *Attorney, Agent, or Firm* — Suiter Swantz pc llo

(57) ABSTRACT

A system for confirming a computing environment includes a remote computing device connected by a communication network to a computing device. The remote computing device generates a nonce, or number used once, and executes an attestation function to determine an attestation measurement value based on the contents of the memory of the remote computing device. The nonce is transmitted by the network to the computing device, which uses the nonce to execute the attestation function based on the contents of the memory of the computing device and determine an attestation measurement value. This attestation measurement value is transmitted to the remote computing device. If the attestation measurement values match, the computing device is designated as trusted. If the attestation measurement values mismatch, the computing device is designated as untrusted.

8 Claims, 3 Drawing Sheets

COMPUTING SYSTEM ATTESTATION

CROSS REFERENCE TO RELATED APPLICATIONS

This application relates to the following application filed on Jun. 29, 2016 and incorporated herein by this references in its entirety: Distributed Vetronics Intrusion Detection System and Device by Luke E. Ryon and Carl J. Riechers, having U.S. patent application Ser. No. 15/196,730.

BACKGROUND

Embodiments of the inventive concepts disclosed herein are generally directed to computing systems and methods for confirming the integrity of a computing environment.

Computing systems have evolved from large mainframe computers that formerly filled an entire room and cost millions of dollars, to miniature devices smaller than a dime and costing less than one dollar. In recent years, an increasing number of computing systems of all sizes are being connected to data communication networks. Even the computing systems used to operate and control ground vehicles and aircraft are now being connected to communication networks. By being connected to a network like the Internet that is available to essentially anyone, computing systems may be subject to the risk of unwanted, unauthorized or possibly harmful access, modification, or control by some outside party. It has become increasingly important to ensure that a computing system has not been compromised in any way so that the expected outcome of the desired computing operation may be achieved without loss of information, function, or safety.

Various approaches have been used to prevent unauthorized access to computing systems, including so-called firewalls that limit access to computers from networks such as the Internet, user authentication such as password verification, blacklisting (keeping a list of recognized bad actors), whitelisting (keeping a list of trusted actors), and the like. In spite of all of these efforts to prevent unauthorized access, outside parties have continued to successfully defeat these protection mechanisms, and have gained access to computing systems to extract private user data, install potentially harmful software (malware), interfere with the availability and use of the computer system, and carry out other unauthorized and unintended exploits.

SUMMARY

In one aspect, the inventive concepts disclosed herein are directed to a system for confirming that a computing environment including memory contents and operational state is the same as a known malware-free computing environment.

In a further aspect, the inventive concepts disclosed herein are directed to a system for confirming that a network connected computing environment is the same as a known malware-free computing environment.

In a further aspect, the inventive concepts disclosed herein are directed to a system for confirming that a safety critical computing environment such as the kind used for ground vehicles or avionics systems including memory contents and operational state is the same as a known malware-free safety critical computing environment.

In a further aspect, the inventive concepts disclosed herein are directed to a method for confirming that a network connected computing environment including memory contents and operational state is the same as a known malware-free computing environment.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
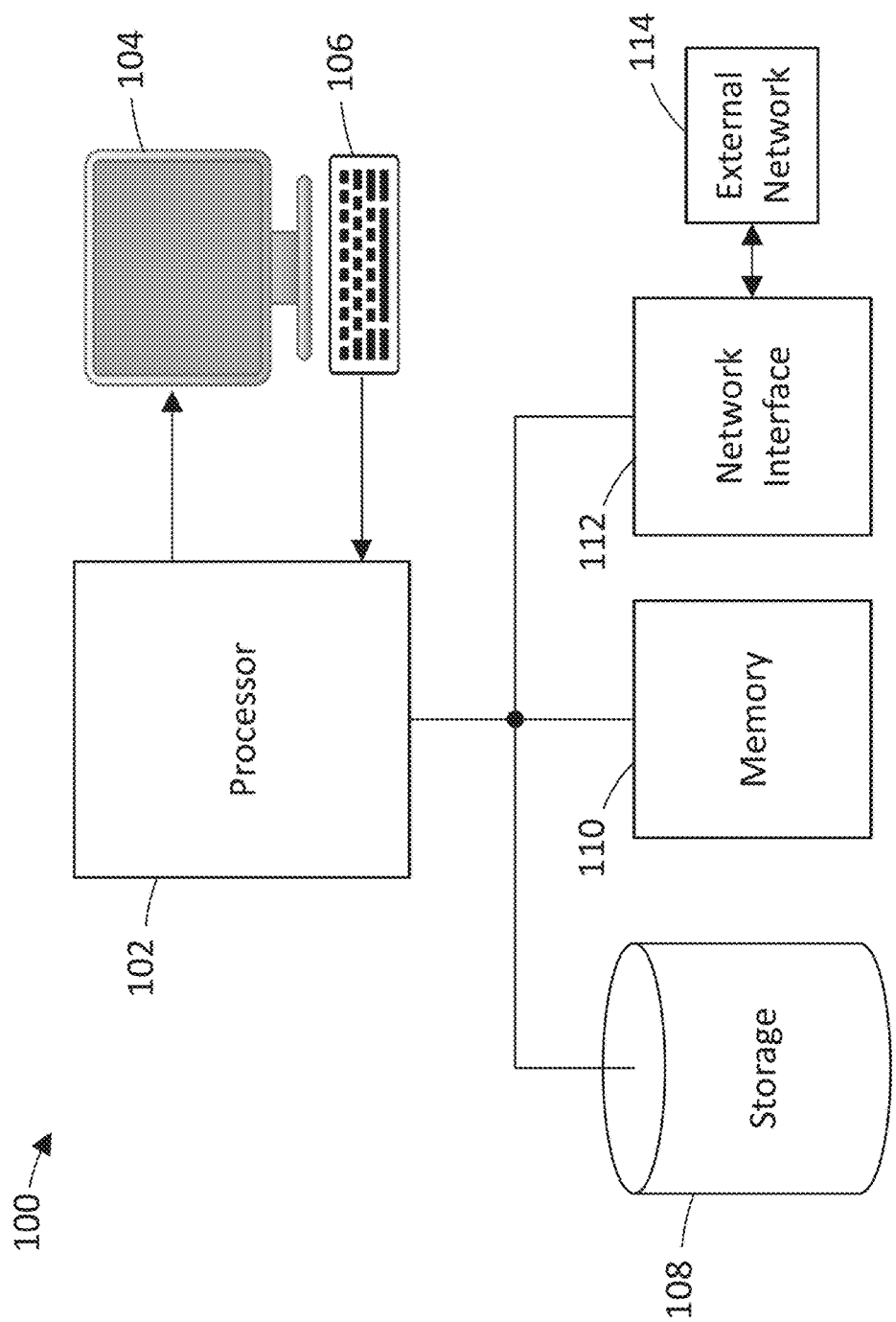
FIG. 1 is a diagram of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to confirming the integrity of a computing environment.

Referring now to FIG. 1, a computing device 100 may include a processor 102 operatively coupled to a display monitor 104 or other operator visual interface, and a keyboard 106 or other input device for interface to a user. The processor 102 may further be operatively coupled to a storage unit 108, a memory 110 and a network interface 112. The storage unit 108 may be a non-transitory processor-readable medium storing processor-executable code and program data for use by the processor 102 for execution of one or more computing operations. The memory 110 may be initialized by moving processor-executable code and program data from the storage unit 108. The network interface 112 may be operatively coupled to an external communication network 114 for receiving from and transmitting information to other computing devices.

Still referring to FIG. 1, the contents of the storage unit 108 or the memory 110 could possibly be compromised by either an accidental or a purposeful event that could cause the processor-executable code or program data to have incorrect or unintended contents. The contents of the storage unit 108 or the memory 110 could be accidently modified by an electromagnetic event such as a power transient or an incident electromagnetic field. The contents of the storage unit 108 or the memory 110 could be accidently modified by execution of previously undetected improperly designed software or by some other malfunctioning program execution. Alternatively, the contents of the storage unit 108 or the memory 110 could be purposely modified by an intrusion of an unauthorized user using the network connection. Such intrusions into computing environments may insert malware, or malicious, harmful, or damaging code intended to carry out the purposes of the unauthorized user, potentially at a cost or detriment to the authorized users of the computing device.

Still referring to FIG. 1, in an embodiment, either or both of the storage unit 108 or the memory 110 may be initially filled with a known predetermined pattern. The pattern may be one or more of: a predefined known random data stream, a predefined pseudo-random data stream, or an unpredictable runtime data stream provided by a remote computing device such as the remote computing device 202 of FIG. 2. The pattern may be chosen such that generation of the pattern is computationally complex, and would require substantial processing time and resources. This would enable detection of malware attempting to falsely replicate the pattern. The processor 102 may periodically examine the contents of the storage unit 108 or the memory 110 to confirm that the portions of storage or memory space not occupied by processor-executable code or program data match the known predetermined pattern. In some embodiments, a remote computing device such as the remote computing device 202 of FIG. 2 may communicate with the computing device 100 by way of the external network 114, and may have full knowledge of the memory layout of the computing device 100 to examine the contents of the storage unit 108 or the memory 110 to confirm that the portions of storage or memory space not occupied by processor-executable code or program data match the known predetermined pattern.

Still referring to FIG. 1, in some embodiments, the computing device 100 may be configured to perform safety critical computing operations such as controlling the flight or other operations of an aircraft. Safety critical computing systems may require special design, development, documentation and certification processes and procedures to ensure that the integrity of the hardware and software is sufficient.

Figure 2:
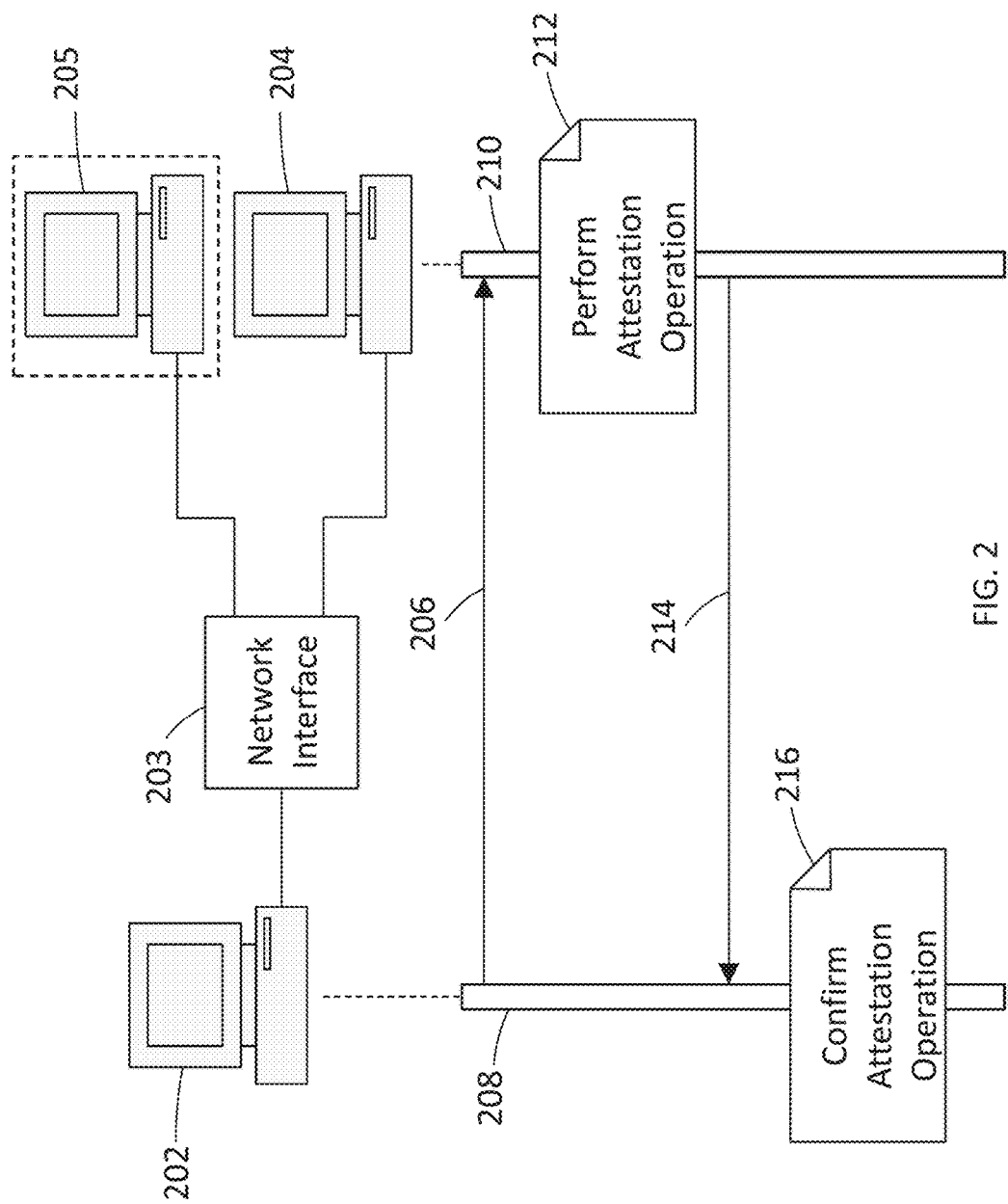
FIG. 2 is a diagram of an exemplary embodiment of a system according to the inventive concepts disclosed herein.

Referring now to FIG. 2, a computing system according to the inventive concepts disclosed herein includes a computing device 204 which has a processor, a memory, a communication interface, and operating software to create a computing environment for implementation of one or more computing functions. The computing device 204 may include a display for presentation of information to a user. The computing device 204 may also include a keyboard, a graphical input device, a touch screen, a voice input device, or the like. The computing device 204 may be connected to one or more communication interfaces 203 for receiving and transmitting information to other computing devices. The communication interfaces may include point-to-point or networked, and wired or wireless interfaces.

Still referring to FIG. 2, a remote computing device 202 may be configured with a processor, memory and operating software to create a computing environment for implementation of one or more computing functions. The remote computing device 202 may be located a distance from the computing device 204. The remote computing device 202 may include a display for presentation of information to a user. The remote computing device 202 may also include a keyboard, a graphical input device, a touch screen, a voice input device, or the like. The remote computing device 202 may be connected to one or more communication networks 203 for receiving and transmitting information to other computing devices. The remote computing device 202 may execute a sequence of computing operations 208 to perform one or more computing functions.

Still referring to FIG. 2, the remote computing device 202 may transmit a message 206 across the communication network to the computing device 204 to cause the computing device 204 to perform an attestation operation 212. In some embodiments, the message 206 transmitted from the remote computing device 202 to the computing device 204 may be encrypted using a cryptographic process. In some embodiments, the computing device 204 may execute a sequence of computing operations 210 to decrypt the encrypted message 206 in order to access the information contained in the message.

Still referring to FIG. 2, the message 206 may also include a nonce, or "number used once" supplied by the remote computing device 202 to the computing device 204. The computing device 204 may use the nonce as a "seed" or initialization value to be used in the execution of an attestation function 212 on one or more portions of the computing environment associated with the computing device 204. The portions may include registers, memory, file storage, and any other computing resources used by the computing device 204. The nonce is intended to be used only one time to prevent replay exploits where a previously generated attestation measurement value is generated again before inserting malware into the computing device 204, or pre-computation exploits where a previously generated attestation measurement value is stored in advance and falsely represents a current attestation measurement value to prevent detection of the insertion of malware into the computing device 204. The attestation function may be a type of hash function such as a checksum, cyclic redundancy check (CRC), non-cryptographic hash function, or cryptographic hash function.

Still referring to FIG. 2, determination of an attestation measurement value may be performed on any of the portions of the computing environment associated with the computing device 204, including registers, memory, file storage, low level device information (part/serial numbers), bad memory block locations, physical unclonable functions (PUFs), and any other computing resources. When performing an attestation operation 212 on the storage unit, a known order of operations on files may be used to cause determination of a repeatable attestation measurement value. The amount of processor execution time required to determine the attestation measurement value may be captured and associated with the attestation measurement value to enable detection of malware attempting to falsely replicate the attestation measurement value.

Still referring to FIG. 2, upon completion of the execution of the attestation function 212, the computing device 204 may transmit a message 214 to the remote computing device 202 with an attestation measurement value determined by the attestation function 212. The remote computing device 202 may perform an attestation validation function 216 by comparing the attestation measurement value determined by the computing device 204 with its own independently determined attestation measurement value. If the attestation measurement values match, the computing device 204 may be designated by the remote computing device 202 as trusted. If the attestation measurement values do not match, the computing device 204 may be designated by the remote computing device 202 as untrusted.

Still referring to FIG. 2, in some embodiments, the remote computing device 202 may be configured with predetermined pairs of nonce values and attestation measurement values. The remote computing device 202 may reference these predetermined pairs of values to compare to the attestation measurement value determined and transmitted by the computing device 204. The predetermined pairs of nonce values and attestation measurement values configured in the remote computing device 202 may be kept confidential to maintain a desired level of integrity of the computing device 204.

Still referring to FIG. 2, in some embodiments, one or more computing devices 204 or 205 may be uniquely identified with a digital identifying code. The attestation function may include the digital identifying code along with the nonce and the registers, memory, file storage, low level device information (part/serial numbers), bad memory block locations, physical unclonable functions (PUFs), and any other computing resources normally used to determine the attestation measurement value. The attestation function may alternatively exclude the digital identifying code while including the nonce and the registers, memory, file storage, low level device information (part/serial numbers), bad memory block locations, physical unclonable functions (PUFs), and any other computing resources normally used to determine the attestation measurement value. The remote computing device 202 may locally determine its own instance of the attestation measurement value using a locally stored copy of the digital identifying code, the nonce, registers, memory, file storage, low level device information (part/serial numbers), bad memory block locations, physical unclonable functions (PUFs), and any other computing resources associated with the computing device 204 and the computing device 205. The remote computing device 202 may alternatively be configured with predetermined sets of digital identifying codes, nonce values and attestation measurement values that may be compared to the attestation measurement value determined and transmitted by the computing device 204 and the computing device 205.

Still referring to FIG. 2, the designation of the computing device 204 being untrusted may be communicated to the computing device 204, which may cause the computing device 204 to initiate one or more responsive actions, including suspending critical or sensitive computing processes, or re-initializing some or all of the computing processes of the computing device 204. Alternatively, the designation of the computing device 204 as untrusted may be withheld from the computing device 204 but communicated to one or more other computing resources connected to the computing device 204 by the communication network, so that no critical or sensitive computing process being performed by the other computing resources will rely on a computing operation being performed by the computing device 204.

Still referring to FIG. 2, the remote computing device 202 may be operatively coupled by a network 203 to two or more similarly configured computing devices 204 and 205. The remote computing device 202 may transmit a message 206 across the network 203 to the computing device 204 to cause the computing device 204 to perform an attestation operation 212. The computing device 204 may transmit a message 214 across the network 203 to the remote computing device 202 with a code indicative of the attestation measurement value of the attestation function for the computing device 204. The remote computing device 202 may transmit a subsequent message 206 across the network 203 to the computing device 205 to cause the computing device 205 to perform an attestation operation 212. The computing device 205 may transmit a message 214 across the network 203 to the remote computing device 202 with a code indicative of the attestation measurement value of the attestation function for the computing device 205. The remote computing device 202 may compare the attestation measurement values returned from the computing device 204 and the computing device 205 with no knowledge of the memory layouts of the computing device 204 or the computing device 205. If the attestation measurement values match, the computing device 204 and the computing device 205 may be designated by the remote computing device 202 as trusted. If the attestation measurement values do not match, neither the computing device 204 nor the computing device 205 may be designated by the remote computing device 202 as trusted. Remote attestation of an arbitrary number of computing devices 204, 205 and the like may be accomplished according to the inventive concepts disclosed herein.

Still referring to FIG. 2, in some embodiments, the computing device 204 may be configured to perform safety critical computing operations such as controlling the flight or other operations of an aircraft. Certification of a computing device 204 for flight safety critical applications is typically required by regulatory agencies such as the Federal Aviation Administration (FAA). Development or modification of FAA certified computing systems including the addition of an attestation function is complex and costly.

It would be beneficial to perform attestation of certified safety critical computing systems to ensure the system has not been compromised by malware. Attestation of a safety critical computing system may be configured to utilize a system maintenance mode to avoid incurring the complexity and cost of certification of an attestation function. A pseudo-bootstrap loader may be configured to operate in the maintenance mode of the system. When the pseudo-bootstrap loader completes loading of the maintenance mode function, the processor may execute code to perform the functions of a second-stage bootstrap loader, which may then load executable code for either a normal maintenance mode or the attestation mode according to the inventive concepts disclosed herein. In some embodiments, execution of the attestation function by utilizing a system maintenance mode may be configured to be initiated only when the system is in a known safe operating mode such as an aircraft having weight-on-wheels (WoW).

Figure 3:
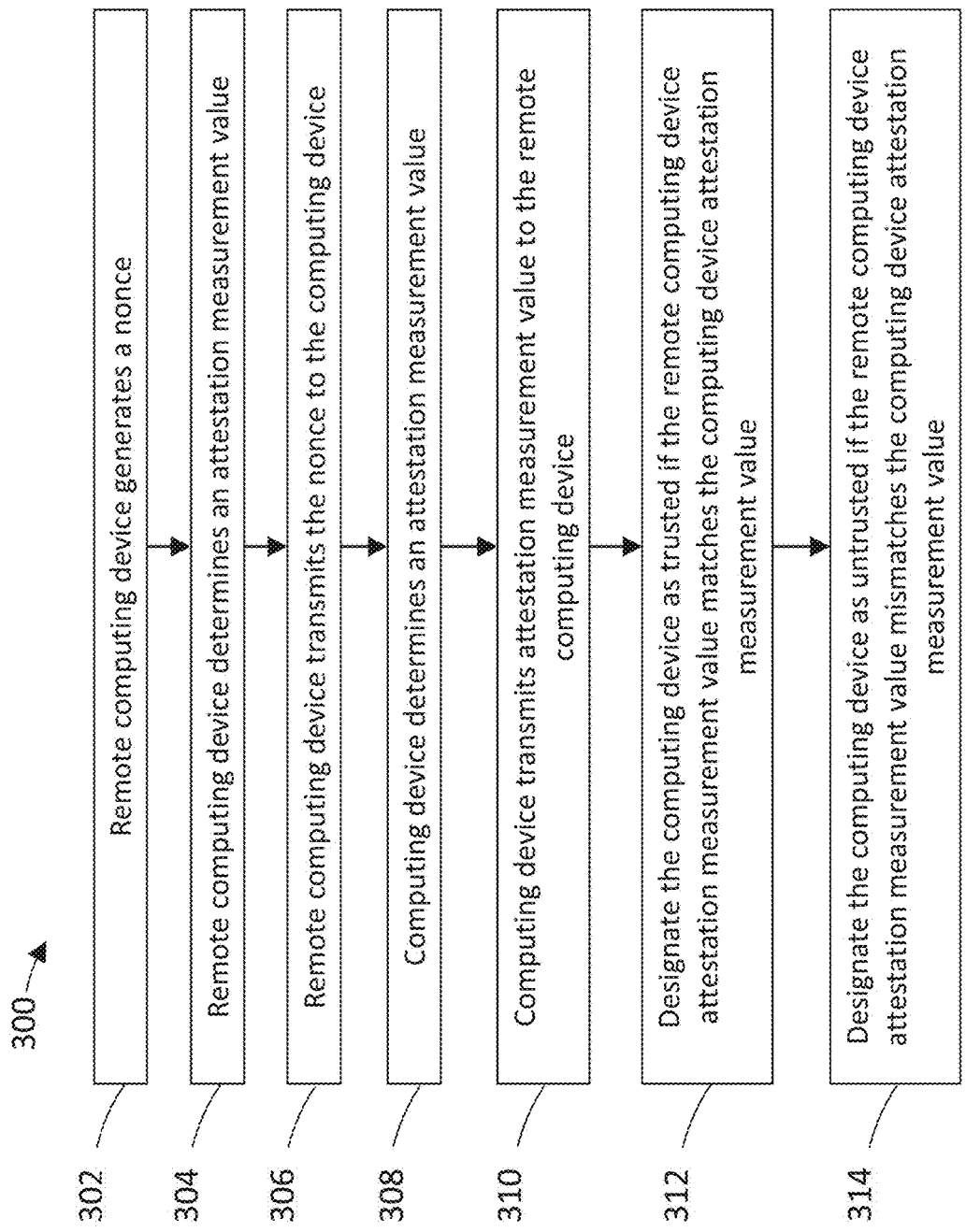
FIG. 3 is a diagram of an exemplary embodiment of a method according to the inventive concepts disclosed herein.

Referring now to FIG. 3, an exemplary embodiment of a method 300 according to the inventive concepts disclosed herein may include one or more of the following steps.

In a step 302 a remote computing device generates a nonce.

In a step 304, the remote computing device determines an attestation measurement value based on the nonce.

In a step 306, the remote computing device transmits the nonce to the computing device.

In a step 308, the computing device determines an attestation measurement value based on the received nonce.

In a step 310, the computing device transmits the attestation measurement value to the remote computing device.

In a step 312, the computing device is designated as trusted if the remote computing device attestation measurement value matches the computing device attestation measurement value.

In a step 314, the computing device is designated as untrusted if the remote computing device attestation measurement value mismatches the computing device attestation measurement value.

As will be appreciated from the above, the attestation system and method according to embodiments of the inventive concepts disclosed herein may provide improved security for network connected computing environments.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for confirming a computing environment, comprising:

at least one first processor; and a first non-transitory processor-readable medium storing processor-executable code coupled with the at least one first processor, the processor-executable code for causing the at least one first processor to:

generate a nonce;

determine a first attestation measurement value based on the nonce and a predetermined pattern that is stored in at least one portion of a first memory of the at least one first processor that is not occupied by processor-executable code or program data for the at least one first processor;

transmit the nonce to at least one second processor via a communication network;

receive, via the network, a second attestation measurement value determined by the at least one second processor based on the nonce and another instance of the predetermined pattern that is stored in at least one portion of a second memory of the second processor that is not occupied by processor-executable code or program data for the second processor, wherein the second memory of the second processor is different from the first memory of the at least one first processor;

periodically examine the at least one portion of the first memory of the at least one first processor that is not occupied by the processor-executable code or program data for the at least one first processor to confirm that the contents of the at least one portion of the first memory of the at least one first processor that is not occupied by the processor-executable code or program data for the at least one first processor match the predetermined pattern; and at least one of:

designate the at least one second processor as an untrusted processor based on the first attestation measurement value mismatching the second attestation measurement value; and designate the at least one second processor as a trusted processor based on the first attestation measurement value matching the second attestation measurement value.

2. The system of claim 1, wherein second non-transitory processor-readable medium storing processor-executable code is coupled with the at least one second processor, the processor-executable code for causing the at least one second processor to perform safety critical computing operations.

3. The system of claim 1, wherein the processor-executable code further causes the at least one first processor to:

via the network, periodically examine the at least one portion of the second memory of the second processor that is not occupied by the processor-executable code or program data for the second processor to confirm that the contents of the at least one portion of the second memory of the second processor that is not occupied by the processor-executable code or program data for the second processor match the predetermined pattern.

4. The system of claim 1, wherein the predetermined pattern comprises at least one of: a predefined known random data stream, a predefined pseudo-random data stream, or an unpredictable run-time data stream.

5. A method of confirming the integrity of a computing environment, comprising:
   generating a nonce by the at least one first processor;
   determining a first attestation measurement value by the at least one first processor based on the nonce and a predetermined pattern that is stored in at least one portion of a first memory of the at least one first processor that is not occupied by processor-executable code or program data for the at least one first processor;
   transmitting the nonce from at least one first processor to at least one second processor via a communication network;
   receiving, from the at least one second processor via the communication network, a second attestation measurement value determined by the at least one second processor based on the nonce and another instance of the predetermined pattern that is stored in at least one portion of a second memory of the second processor that is not occupied by processor-executable code or program data for the second processor, wherein the second memory of the second processor is different from the first memory of the at least one first processor;
   periodically examining, by the at least one first processor, the at least one portion of the first memory of the at least one first processor that is not occupied by the processor-executable code or program data for the at least one first processor to confirm that the contents of the at least one portion of the first memory of the at least one first processor that is not occupied by the processor-executable code or program data for the at least one first processor match the predetermined pattern;
   designating the at least one second processor as trusted when the second attestation measurement value matches the first attestation measurement value; and
   designating the at least one second processor as untrusted when the second attestation measurement value mismatches the first attestation measurement value.

6. The method of claim 5, wherein
the second processor is configured to perform safety critical computing operations.

7. The method of claim 5, further comprising:
periodically examining, by the at least one first processor via the communication network, the at least one portion of the second memory of the second processor that is not occupied by the processor-executable code or program data for the second processor to confirm that the contents of the at least one portion of the second memory of the second processor that is not occupied by the processor-executable code or program data for the second processor match the predetermined pattern.

8. The method of claim 5, wherein
the predetermined pattern comprises at least one of: a predefined known random data stream, a predefined pseudo-random data stream, or an unpredictable runtime data stream.

* * * * *